Jan. 14, 1969  S. A. SEYMOUR  3,421,647
MOBILFEEDER-WHEEL ARRANGEMENT
Filed June 20, 1966  Sheet 1 of 2

INVENTOR.
SHAUN A. SEYMOUR
BY
Donald D. Schaper
ATTORNEY

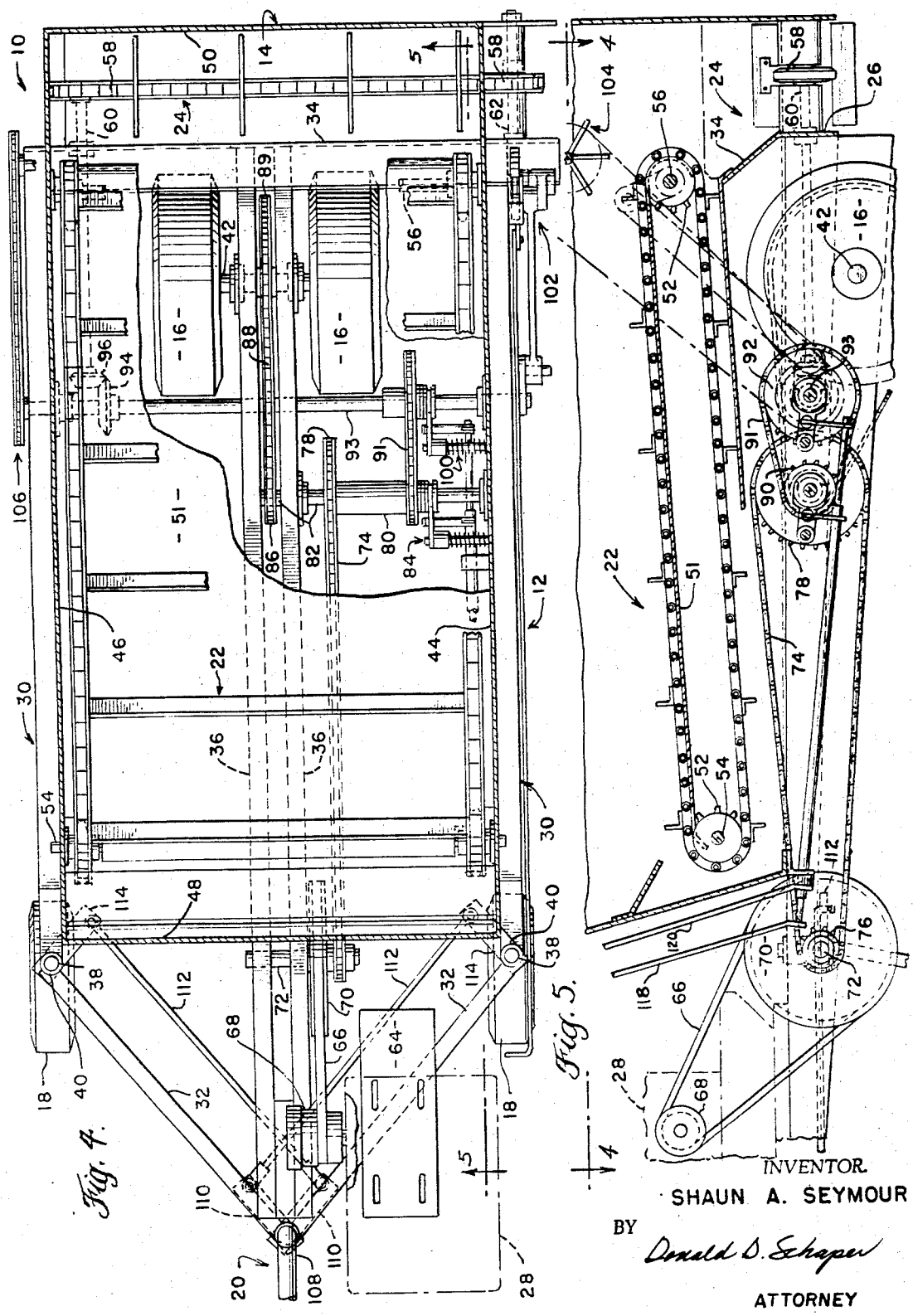

United States Patent Office 3,421,647
Patented Jan. 14, 1969

3,421,647
MOBILFEEDER-WHEEL ARRANGEMENT
Shaun A. Seymour, Ephrata, Pa., assignor to Sperry Rand Corporation, New Holland, Pa., a corporation of Delaware
Filed June 20, 1966, Ser. No. 558,933
U.S. Cl. 214—519     2 Claims
Int. Cl. B60p *1/00;* B62d *51/04*

ABSTRACT OF THE DISCLOSURE

A steerable, self-propelled, self-unloading material-handling vehicle comprising cooperable longitudinally and laterally directed material conveying means, longitudinally extended medial and marginal spaced-apart vehicle frame members, steerable vehicle wheels supported within frame members toward the rearward end thereof, and vehicle-supporting self-propelling, driven wheels supported closely adjacent to and by said medial frame members toward the forward end of said vehicle.

---

This invention relates generally to a material handling vehicle, and more specifically, to such a vehicle of the self-propelled, self-unloading type.

It is common for a farmer to employ some type of material handling vehicle, or feed cart, to transport feed to feed receptacles in farm buildings. Normally, these vehicles are self-unloading and may be self-propelled or of the push type. One of the main problems has been to provide a vehicle of sufficient capacity which can easily be maneuvered in the building passageways.

One object of this invention is to provide a material handling vehicle of the type described which is particularly adapted for use in barns and other farm structures.

Another object of this invention is to provide a vehicle of the type described with a novel wheel arrangement so that the vehicle can be steered around and over feed receptacles.

Another object of this invention is to provide a material handling vehicle with a conveying means so arranged relative to the drive means that the vehicle overall dimensions are small relative to the vehicle capacity.

A further object of this invention is to provide means for independently operating the vehicle propelling means and the unloading means.

A still further object of this invention is to provide a vehicle of simplified construction which is efficient and inexpensive to operate.

Other objects of this invention will be apparent hereinafter from the specification and from the recital in the appended claims.

Figure 1:
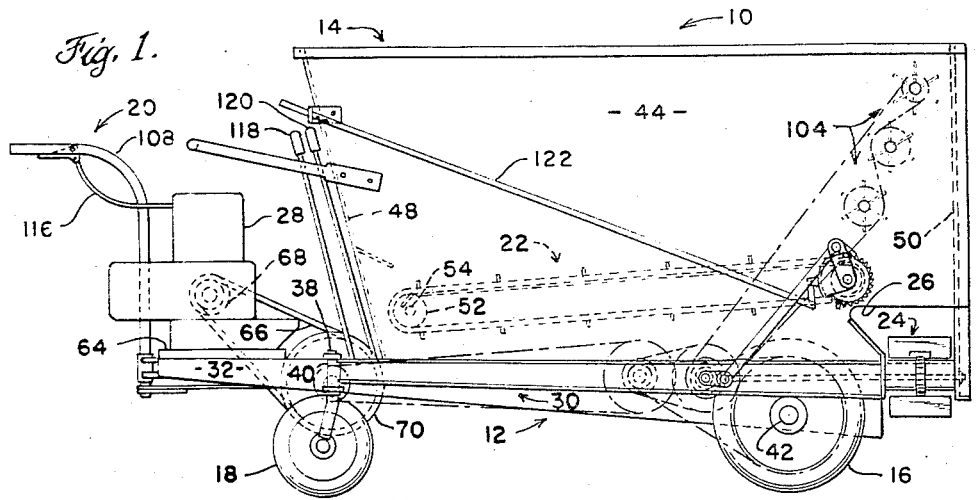
Figure 2:
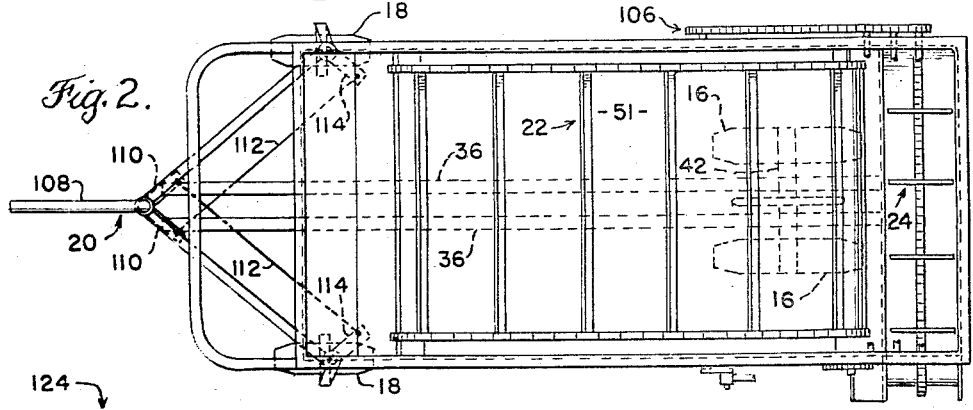
Figure 3:
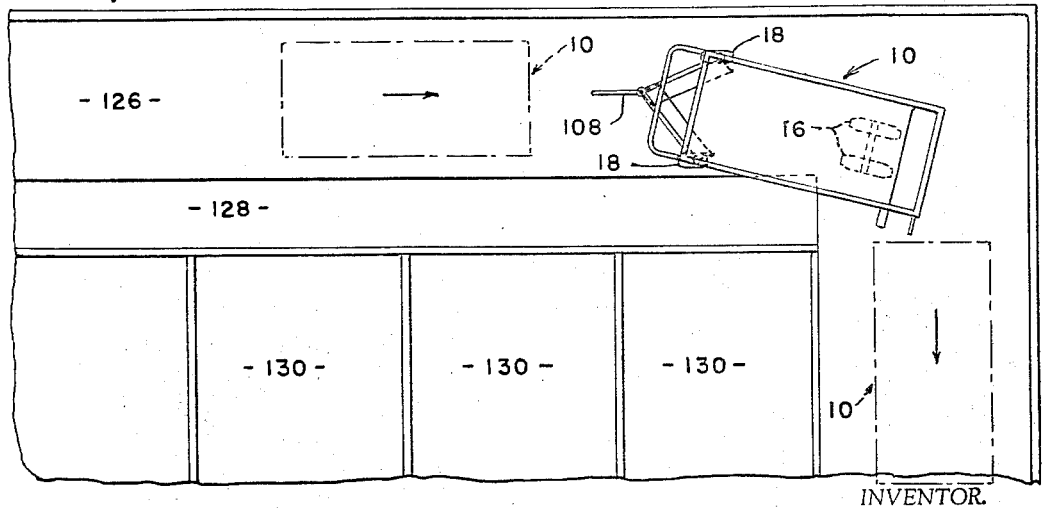

In the drawings:
FIG. 1 is a side elevation of the material handling vehicle;
FIG. 2 is a plan view of FIG. 1;
FIG. 3 is a diagram showing the position of the vehicle relative to a feed receptacle as it is in the process in turning the corner, and illustrating how the narrow gauge drive wheels permit the vehicle to be turned in a small area;
FIG. 4 is an enlarged view of a plan section taken on line 4—4 of FIG. 5, and showing the various drive mechanisms; and
FIG. 5 is a longitudinal section taken on the line 5—5 of FIG. 4.

Referring now to the drawings by numerals of reference, and particularly to FIGS. 1 and 4, the material handling vehicle of this invention is designated generally 10 and comprises a frame 12, a bed 14, a pair of front drive wheels 16, a pair of rear steering wheels 18, and a steering means 20. Unloading means for bed 14 includes an apron conveyor 22 which pushes material forwardly in the bed 14 to a cross conveyor 24 which moves the material across the bed and out of discharge outlet 26. A motor 28 is mounted on the rear end of the vehicle for propelling the vehicle and driving the various machine components.

Frame 12, as shown in FIG. 4, comprises a pair of outer longitudinally extending frame elements 30, each of which has a converging end portion 32 at the rear end of the vehicle, cross member 34 at the forward end of the vehicle, and a pair of inner or medial longitudinally extending frame members 36 which are arranged on opposite sides of the vehicle longitudinal center line, not shown. Rear wheels 18 are of the castor type and each wheel has a vertically extending shaft 38 which is received in a socket 40 in frame element 30. Front drive wheels 16 are mounted closely adjacent the vehicle longitudinal centerline on opposite ends of a shaft 42 journalled in inner frame elements 36.

Bed 14 comprises a pair of side panels 44 and 46, a pair of end panels 48 and 50, and a floor 51 (see FIGS. 4 and 5). Apron conveyor 22 extends around floor 51 and is mounted on sprockets 52 fixed on a shaft 54 journalled in side panels 44, 46 at the rear end of bed 14, and on sprockets 52 fixed to a shaft 56 journalled in side panels 44, 46 at the forward end of the bed. Cross conveyor 24 is mounted on sprockets 58 carried by shafts 60 and 62.

Motor 28 is mounted on motor support 64 at the rear end of the vehicle and furnishes power to the front drive wheels 16 and to the unloading means (see FIGS. 4 and 5) through a belt 66 which extends around motor drive pulley 68 and a large speed reducing pulley 70 on pulley shaft 72 journalled in inner frame members 36. A drive chain 74 takes power from a sprocket 76 on pulley shaft 72 and delivers it to sprocket 78 attached to a sleeve 80 which drives shaft 82 through a clutch 84. A sprocket 86 on shaft 82 delivers power to the front wheels through a chain 88 which extends around a sprocket 89 on front wheel drive shaft 42.

Power is supplied to the unloading means from a drive sprocket 90 on sleeve 80 through a chain 91 which drives a sprocket 92 encircling shaft 93 which is journalled in side panels 44 and 46. Power is selectively transmitted from sprocket 92 to shaft 93 through clutch 100. One end of shaft 93 includes a bevel gear 94 which meshes with a bevel gear 96 on cross conveyor drive shaft 60. At the opposite end of shaft 93, a ratchet drive means 102 of conventional construction serves to drive apron conveyor 22. Beaters 104 are driven by a drive chain 106 which is also powered by shaft 93. It will be seen that power to each of the unloading elements is controlled by clutch 100.

Steering means 20 comprises a pivotally mounted vertically extending steering post 108 having a pair of brackets 110 fixed to its lower end. Vertical shafts 38 on wheels 18 are connected to brackets 110 through rods 112 and elements 114 fixed to shafts 38.

Vehicle controls comprise a throttle control 116, clutch levers 118 and 120, and apron drive control lever 122.

An important feature of this invention is the novel arrangement of the vehicle wheels. With reference to FIG. 3, a farm building 124 is shown having a passageway 126 and a feed receptacle 128 in the floor of the building. Animal stalls 130 are positioned at one side of the feed receptacle. Vehicle 10 is shown in dot-and-dash lines just prior to and just after turning a corner and in solid lines as it is turning a corner. It will be seen from FIG. 3 that, by positioning the front drive wheels 16 adjacent the longitudinal center line of the vehicle, a much smaller area is required to turn the vehicle around the corner without passing the wheels through the feed receptacle 128.

In operation, vehicle 10 would normally be filled with a feed from a storage facility, such as a silo. Then, with clutch 100 disengaged, and clutch 84 engaged, the vehicle would be driven to a barn or other farm building. With the vehicle in a barn passageway, and with the discharge outlet 26 over the feed receptacle, both clutches 84 and 100 would be engaged respectively by levers 120 and 118. Cross conveyor 24 would discharge the material into the receptacle and apron conveyor 22 would serve to feed the material into the cross conveyor 24 as the vehicle moves along the receptacle. The material would be kept agitated near the forward end by beaters 104.

While this invention has been described in connection with a particular embodiment thereof, it will be understood that it is capable of modification, and this application is intended to cover any variations, uses, or adaptations following, in general, the principles of the invention and including such departurse from the present disclosure as come within known or customary practice in the art to which the invention pertains, and as fall within the scope of the invention or the limits of the appended claims.

Having thus described my invention, what I claim is:

1. A material handling vehicle comprising a frame supported for travel on a surface in a forward direction and having a fore-and-aft extending longitudinal center line, bed means carried on said frame and having a pair of spaced side panels, a pair of rear wheels arranged at opposite sides of said frame at a rear end of said vehicle, steering means on said frame for turning said vehicle, said frame further including a medially disposed, longitudinally extended frame member extending along the longitudinal center line, a drive shaft journalled in said frame member near the front of the vehicle, a pair of wheels fixed at opposite ends of said drive shaft and disposed more closely adjacent the longitudinal center line than the rear wheels, one of said side panels having a discharge outlet therein, unloading means in said bed means for moving material therein toward and out of said outlet, a power source on said frame operatively connected to said unloading means, and also operatively connected to said drive shaft to rotate said front wheels to propel the vehicle, said wheel arrangement disposed in a manner so that said vehicle may be steered around a cavity in said surface with a portion of said vehicle extending over said cavity and without passing either of said front wheels through said cavity.

2. A material handling vehicle, as recited in claim 1, wherein said rear wheels are mounted for pivotal movement in outer longitudinally extending frame members arranged on opposite sides of said centerline, said steering means comprises a steering post at the rear end of said frame, and means operatively connects said post to each of said rear wheels so that pivotal movement of said post through a given arc imparts a corresponding pivotal movement to each of said rear wheels.

References Cited

UNITED STATES PATENTS

| 2,674,328 | 4/1954 | Searls | 180—26 X |
|---|---|---|---|
| 2,795,914 | 6/1957 | Smith | 180—19 X |
| 3,106,304 | 10/1963 | Smale | 214—519 |
| 3,308,974 | 3/1967 | Rosenbaum | 214—83.36 |

ALBERT J. MAKAY, *Primary Examiner.*

U.S. Cl. X.R.

180—19